H. A. A. THORN.
CLIP FOR ATTACHING THE LOCK PLATES OF GUNS.
APPLICATION FILED MAR. 8, 1912.
1,035,498.
Patented Aug. 13, 1912.
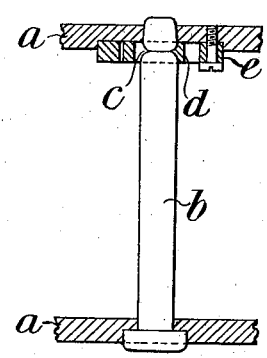
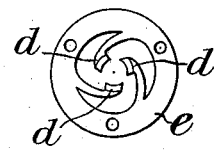
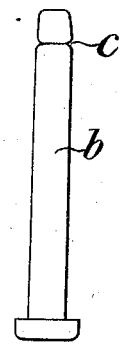
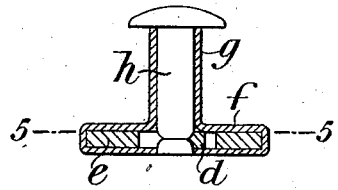
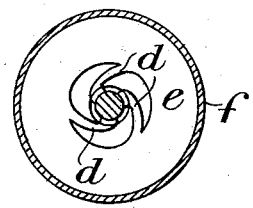
Witnesses.
J. K. Moore
R. H. E. Davy
Inventor.
Henry A. A. Thorn
by
Whitaker Prevost
atty.

UNITED STATES PATENT OFFICE.

HENRY ALFRED ALEXANDER THORN, OF HAYMARKET, LONDON, ENGLAND.

CLIP FOR ATTACHING THE LOCK-PLATES OF GUNS.

1,035,498.      Specification of Letters Patent.      Patented Aug. 13, 1912.

Application filed March 8, 1912. Serial No. 682,417.

*To all whom it may concern:*

Be it known that I, HENRY ALFRED ALEXANDER THORN, a subject of the King of Great Britain, residing at 11 Panton street, Haymarket, London, England, have invented new and useful Improvements in Clips for Attaching the Lock-Plates of Guns, of which the following is a specification.

My invention chiefly relates to means for attaching lock plates to the stocks of sporting and other guns, and to that method of attachment wherein the plates on both sides of the stock are secured, preferably, by a single bolt or pin which passes through the stock and engages with both plates, but my invention is also applicable for locking the detachable shanks of studs to their bases and for similar purposes.

According to my invention, I arrange in conjunction with the grooved end of a bolt or pin most remote from the head, and which for convenience of description I will refer to as the tail end, a spring clip which engages therewith, the said clip being formed out of a steel plate having a series of arms formed integral therewith and curved or bent so as to engage with the groove in the tail end of the bolt or pin.

To enable my invention to be fully understood I will describe the same by reference to the accompanying drawing, in which:—

Figure 1 is a sectional plan view of my improved locking device as applied to the lock plates of a gun. Fig. 2 is a face view of the clipping device detached, and Fig. 3 is a plan view of the locking bolt or pin detached. Fig. 4 is a view of a stud the shank of which is attached by means of the spring clip. Fig. 5 is a section on the line 5—5, Fig. 4. Fig. 6 is a view of a modified form of a clip, and Fig. 7 is a view illustrating the formation of the clip shown in Fig. 6.

Referring to Figs. 1 to 3, *a, a* indicate the lock plates, and *b* the locking bolt or pin which is passed through the said plates so that its tail-end projects somewhat beyond the external surface of the plate through which it passes. *c* is a recess, groove or cannelure formed in the tail-end of the pin, and *d, d, d* are the spring arms designed to engage in the said groove, the said arms being formed out of a single plate or disk *e,* as clearly shown in Fig. 2.

It will be understood by reference to the drawing that the tail-end of the pin is slightly rounded at the angle, and that the walls of the groove are also slightly rounded, the object of this construction being, that when the pin *b* comes into contact with the spring arms *d, d, d* it will push the said arms laterally so that the tail-end will pass between them, and also that when the pin is being removed by pressure on the tail end, the arms will be pushed back to allow the pin to be disengaged from the clip.

With the construction hereinbefore described it will be obvious that the pin or bolt *b* can be disengaged from the lockplates without the use of a screw-driver or key, pressure upon the end of the pin being sufficient to effect the engagement and disengagement.

Although I have previously referred to my invention as being used in a gun wherein the lockplates are secured by a single bolt, it will be obvious that the invention will be equally applicable in cases where two or more pins are employed. It will also be obvious that the spring clip hereinbefore described is applicable for other purposes than that above referred to. Figs. 4 and 5 show it applied to a stud having a removable shank.

*e* indicates the spring plate having the arms *d, d* and *f* a casing which incloses the said plate and is provided with a tubular portion *g* into which the shank proper *h* of the stud fits.

Figs. 6 and 7 illustrate a modified form of clip wherein the spring arms *d, d* instead of being formed in an aperture in the disk *e* are formed on the exterior of the latter, and then curved inward into proximity to the central aperture in the said disk.

Claims.

1. In a sporting or other gun, the combination with the lockplates of a pin passing through the said lockplates and a clip secured to one of the said lockplates with which the said pin is designed to be engaged and disengaged by pressure, substantially as described.

2. The combination with a pin having a groove near one end and rounded at its extremity, of a spring clip consisting of a plate having a central aperture and of a series of spring arms designed to engage with the groove in the pin, substantially as described.

HENRY ALFRED ALEXANDER THORN.

Witnesses:
 JOHN E. BOUSFIELD,
 C. G. REDFERN.